W. C. SHINN.
BRACE FOR LIGHTNING ROD TOPS.
APPLICATION FILED JULY 26, 1910.
995,638.
Patented June 20, 1911.
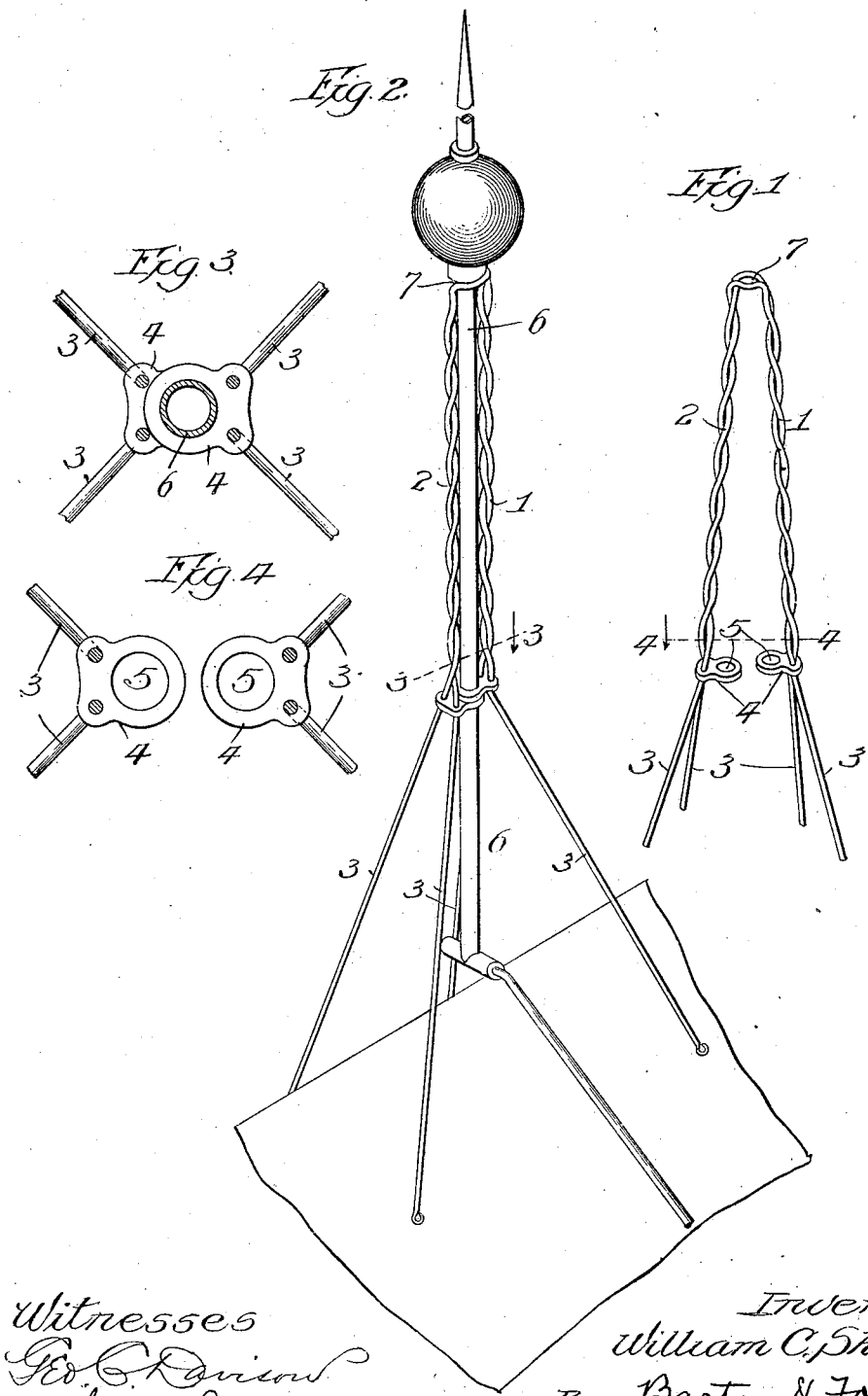

UNITED STATES PATENT OFFICE.

WILLIAM C. SHINN, OF LINCOLN, NEBRASKA.

BRACE FOR LIGHTNING-ROD TOPS.

995,638.  Specification of Letters Patent.  Patented June 20, 1911.

Application filed July 26, 1910. Serial No. 573,868.

*To all whom it may concern:*

Be it known that I, WILLIAM C. SHINN, citizen of the United States, residing at Lincoln, in the county of Lancaster and State of Nebraska, have invented a certain new and useful Improvement in Braces for Lightning-Rod Tops, of which the following is a full, clear, concise, and exact description.

My invention relates to braces for the tubular portion forming the tip of lightning rods. Its object is to provide a brace of simple construction, which is cheap to manufacture, which is durable and strong so that there is no danger of the top braced thereby being blown over, and which is self-locking and clamps the tube against lateral or longitudinal play, thereby preventing the rattling noise which, with the ordinary form of lightning rod brace, is annoying to the occupants of a house during a high wind.

The brace of my invention comprises two flexible standards (preferably each formed of wire twisted together at their upper portions), united at their top and provided at their point of junction with an opening for receiving the tubular tip portion of the lightning rod, each standard being further provided intermediate its top and bottom with a loop or eye, said loops or eyes being adapted to be brought, against the spring tension of the brace, into alinement with each other and with the said opening at the top of the brace to receive the tubular portion forming the tip of lightning rods, such tube being thereby securely clasped and held against lateral or longitudinal movement.

The preferred embodiment of my invention and the several features thereof may be more readily understood by reference to the accompanying drawings in which—

Figure 1 is a perspective view of the brace with the lower portion of the legs thereof broken off; Fig. 2 is a perspective view of the brace as it appears in use with a tube supported thereby; Fig. 3 is an enlarged cross-section approximately on the line 3—3 of Fig. 2; and Fig. 4 is a similar view approximately on the line 4—4 of Fig. 1.

Similar letters of reference refer to similar parts throughout the several views.

The brace is constructed of heavy wires having their middle portions twisted together, forming the upper parts or standards 1, 2 of the brace, the untwisted ends of said wires being spread apart to constitute legs 3 of the brace. The wires are preferably twisted together in opposite directions from their middle portion at which point they are spread apart to form the eye or opening 7. The two halves of the brace are bent upon each other at their middle portion, the spring tension of the wire tending to hold the portions 1 and 2 out of parallel relation to each other, as shown in Fig. 1. The standards are thus united at their tops by the loop forming the eye 7. Threaded on the wire legs 3 are two plates 4, 4, each provided with an eye or loop 5. The legs 3 are spread apart, thus providing a more stable base for the brace and at the same time holding the plates 4 in position immediately beneath the twisted portions 1, 2. The upper portions 1, 2 of the brace can be readily sprung together in parallel relation, so that the eyes 5, 5 may be brought into alinement to receive the tube 6, which tube may be of the usual construction constituting the well-known lightning rod top. When released, the sections 1, 2 tend to spring apart, the plates 4, 4 thus securely clamping the tube against either lateral or longitudinal movement. The legs 3 may be spread apart and secured in the usual way upon the building upon which the lightning rod is affixed.

From the foregoing description it will appear that the brace of my invention comprises two flexible standards united at their top, at which place they are provided with an eye 7 for the reception of the tube 6. Each of said supports is provided with a loop or eye 5, said eyes being adapted to be brought together against the spring tension of the standards into alinement with each other, and with the eye 7 to receive the tube 6. The tube having been inserted, the brace is self-locking by reason of the tendency of the two halves to spring apart. The two opposite portions of the brace are of similar construction and are preferably the one a continuation of the other. The brace is formed of a plurality of wires, in the drawings two are shown, twisted together about their middle portions and bent upon each other, the ends of the wires being spread apart to form a plurality of feet for the brace.

The brace of my invention by reason of its construction holds the tube 6 securely, preventing its being raised by a high wind and otherwise preventing the tube from rattling.

Having thus described my invention, what I claim is:

1. A brace comprising two flexible standards united at their top and having supporting legs at their lower ends, and a loop carried by each of said standards and arranged to be brought into alinement with each other against the tension of said standards.

2. A brace comprising a plurality of wires, assembled side by side and bound together for a portion of the length of said wires, the bound portion of said brace being bent upon itself to form standards, the ends of said wires being spread apart to form supporting legs, and means carried by the opposite halves of said brace for receiving and grasping a tube.

3. A brace comprising a plurality of wires twisted together intermediate their length and having the twisted portion bent upon itself, the ends of the wires being spread apart to form a plurality of legs for said brace, and means carried by the opposite halves of said brace for clamping a tube.

4. A brace for lightning-rod tops, said brace comprising two heavy wires twisted together intermediate their length with the twisted portion bent upon itself at the middle thereof, and having an eye formed in the twisted wires at their bend, the ends of said wires being spread apart to form legs for said brace, and an inwardly projecting plate threaded upon the upper end of each of said legs, said plates being each provided with an eye.

5. A brace for lightning-rod tops, said brace comprising two heavy wires twisted together in opposite directions from the middle of their lengths and having an eye formed between the opposite twists, the two twisted portions being bent toward each other upon the opposite sides of said eye, the ends of said wires being spread apart to form legs for said brace, and loops carried by the opposite halves of said brace and adapted to be brought, against the spring tension of said wires, into alinement with each other and with said eye to receive the lightning-rod top.

In witness whereof, I hereunto subscribe my name this 16th day of July, A. D., 1910.

WILLIAM C. SHINN.

Witnesses:
LIBERTY B. SHINN,
JAMES M. SIMPSON.

---

Copies of this patent may be obtained for five cents each, by addressing the "Commissioner of Patents, Washington, D. C."